United States Patent
Sharma et al.

(10) Patent No.: US 12,216,590 B2
(45) Date of Patent: Feb. 4, 2025

(54) INTERMEDIATE CACHE MANAGEMENT FOR NON-UNIFORM MEMORY ARCHITECTURE

(71) Applicants: ADVANCED MICRO DEVICES, INC., Santa Clara, CA (US); ATI TECHNOLOGIES ULC, Markham (CA)

(72) Inventors: Saurabh Sharma, Santa Clara, CA (US); Hashem Hashemi, Roseville, CA (US); Guennadi Riguer, Markham (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/208,059

(22) Filed: Jun. 9, 2023

(65) Prior Publication Data

US 2024/0411706 A1    Dec. 12, 2024

(51) Int. Cl.
*G06F 12/08*   (2016.01)
*G06F 12/0811* (2016.01)
*G06F 12/126*  (2016.01)

(52) U.S. Cl.
CPC ........ *G06F 12/126* (2013.01); *G06F 12/0811* (2013.01)

(58) Field of Classification Search
USPC ....................................................... 711/118
See application file for complete search history.

(56) References Cited

U.S. PATENT DOCUMENTS

| | | | |
|---|---|---|---|
| 2016/0239423 A1* | 8/2016 | Zhuang | G06F 12/0862 |
| 2016/0239432 A1* | 8/2016 | Zhuang | G06F 12/023 |
| 2018/0113815 A1* | 4/2018 | Eckert | G06F 12/126 |
| 2020/0004692 A1 | 1/2020 | Fan et al. | |
| 2020/0167074 A1 | 5/2020 | Farhan et al. | |
| 2022/0100587 A1 | 3/2022 | Dice et al. | |
| 2022/0414008 A1* | 12/2022 | Patra | H04L 67/568 |
| 2022/0414010 A1 | 12/2022 | Qiu et al. | |
| 2024/0103719 A1* | 3/2024 | Gasparakis | G06F 3/0655 |

FOREIGN PATENT DOCUMENTS

EP    4024213    7/2022

OTHER PUBLICATIONS

International Search Report and Written Opinion issued in Application No. PCT/US2024/032510, mailed Sep. 10, 2024, 12 pages.

\* cited by examiner

*Primary Examiner* — Than Nguyen (57) ABSTRACT

A cache controller of a processing system implementing a non-uniform memory architecture (NUMA) adjusts a cache replacement priority of local and non-local data stored at a cache based on a cache replacement policy. Local data is data that is accessed by the cache via a local memory channel and non-local data is data that is accessed by the cache via a non-local memory channel. The cache controller assigns priorities to local and non-local data stored at the cache based on a cache replacement policy and selects data for replacement at the cache based, at least in part, on the assigned priorities.

20 Claims, 4 Drawing Sheets

INTERMEDIATE CACHE MANAGEMENT FOR NON-UNIFORM MEMORY ARCHITECTURE

BACKGROUND

A processing system typically includes a memory subsystem having memory modules to store data to be accessed by instructions being executed. The memory subsystem can be organized into a memory hierarchy having a main memory at the top of the hierarchy to store a larger quantity of data that can be accessed by the executing instructions, and one or more caches at lower levels of the memory hierarchy to store subsets of the data stored at main memory. Typically, the lower data is stored in the memory hierarchy the more quickly it can be accessed by the processor. To further enhance processing efficiency, the processing system can implement a memory management protocol that governs the particular set of data stored at each level of the memory hierarchy. For example, the processing system can implement a memory management protocol that moves data that has recently been requested for access to lower levels of the memory hierarchy, with the expectation that the data will be accessed again by the processor in the near future, and moves data that has not been accessed recently to higher levels of the memory hierarchy.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As the demands on processors such as central processing units (CPUs), graphics processing units (GPUs), and other parallel processors, and the amount of physical resources needed to satisfy those demands increase, the size of a processor die becomes a limiting factor, because larger dies are more difficult and expensive to manufacture. Some processing systems therefore partition a processor of a processing system into multiple dies (also referred to herein as chiplets) that are configurable to collectively function and interface with an application as a single processor in some instances or as multiple processors in other instances. In various embodiments, and as used herein, the term "chiplet" refers to any device with the following characteristics: 1) consists of a number of an active silicon dies, each containing a portion of the computational logic used to solve a full problem (i.e., the computational workload is distributed across multiples of these active silicon dies); 2) a number of these are packaged together as a monolithic unit on the same substrate; and 3) the programming model can be agnostic of the fact that the combination of these form a single monolithic unit (i.e., each chiplet is not necessarily exposed as a separate device to an application). Thus, in some implementations, a single processor is constructed using a number of chiplets that is configurable depending on computational needs.

In processing systems implementing a Non-Uniform Memory Architecture (NUMA), such as those with multiple dies, data stored at a cache can be accessed both from local memory devices via local memory channels (referred to herein as "local data") and from non-local memory devices via non-local memory channels (referred to herein as "non-local data"). Whereas a local memory access can be performed relatively quickly, non-local memory accesses can take a relatively long time to complete. Accordingly, a memory management protocol based solely on how recently data has been requested, while overlooking the latency introduced by non-local memory accesses, may result in lower performance, negatively impacting the user experience. Further, the impacts of NUMA grow more acute as processing systems are distributed across a growing number of chiplets.

FIGS. 1-4 illustrate techniques for a processing system to adjust a cache replacement priority of local and non-local data stored at a cache based on a cache replacement policy. In some implementations, the processing system includes multiple subsets of chiplets and the cache is an intermediate cache located at a first subset of chiplets. Local data requests originate from the local processor and arrive at the cache via a local memory channel. Non-local data requests originate from a non-local processor at a second (different) chiplet and arrive at the cache via a non-local memory channel. A cache controller selects data for replacement in the corresponding cache. It can do so, in part, based on priorities assigned to local and non-local data stored in the cache. For example, in some implementations, the default behavior of the cache controller is to apply a least recently used (LRU) replacement policy in which cache lines are selected for replacement based on the amount of time they have been stored in the cache without being requested by an associated processor (referred to as the "age" of the data or cache line). In such implementations, the cache controller can adjust the replacement policy based on locality (i.e., whether a given cache line is local or not).

In some embodiments, the cache controller periodically measures the amount of allocated local data (e.g., by counting the number of cache lines that were accessed via local memory channels) and non-local data (e.g., by counting the number of cache lines that were accessed via non-local memory channels). Based on the proportions of local and non-local data and the cache replacement policy, the cache controller can dynamically adjust the priorities of the local and non-local data in its replacement policy.

For example, in some embodiments, the cache controller increases the priority (i.e., increases the likelihood of replacement) of non-local data in response to an amount of non-local data stored at the cache exceeding an amount of local data stored at the cache by more than a first threshold amount. In some embodiments, the cache controller increases the priority of local data in response to an amount of local data stored at the cache exceeding an amount of non-local data stored at the cache by more than a second threshold amount. The second threshold amount is the same as the first threshold amount in some embodiments and is different from the first threshold amount in other embodiments. In some embodiments, if the amount of non-local data stored at the cache does not exceed the amount of local data stored at the cache by the first threshold amount and the amount of local data stored at the cache does not exceed the amount of non-local data stored at the cache by more than the second threshold amount, the cache controller assigns equal priorities to local data and non-local data stored the cache. In some embodiments, the cache replacement policy (and therefore, the assignment of priorities) is based on an application executing at the processing system. By biasing the processing system's cache replacement policy based on the locality of data stored at the cache, the processing system improves the cache replacement policy, resulting in increased processing efficiency.

Figure 1:
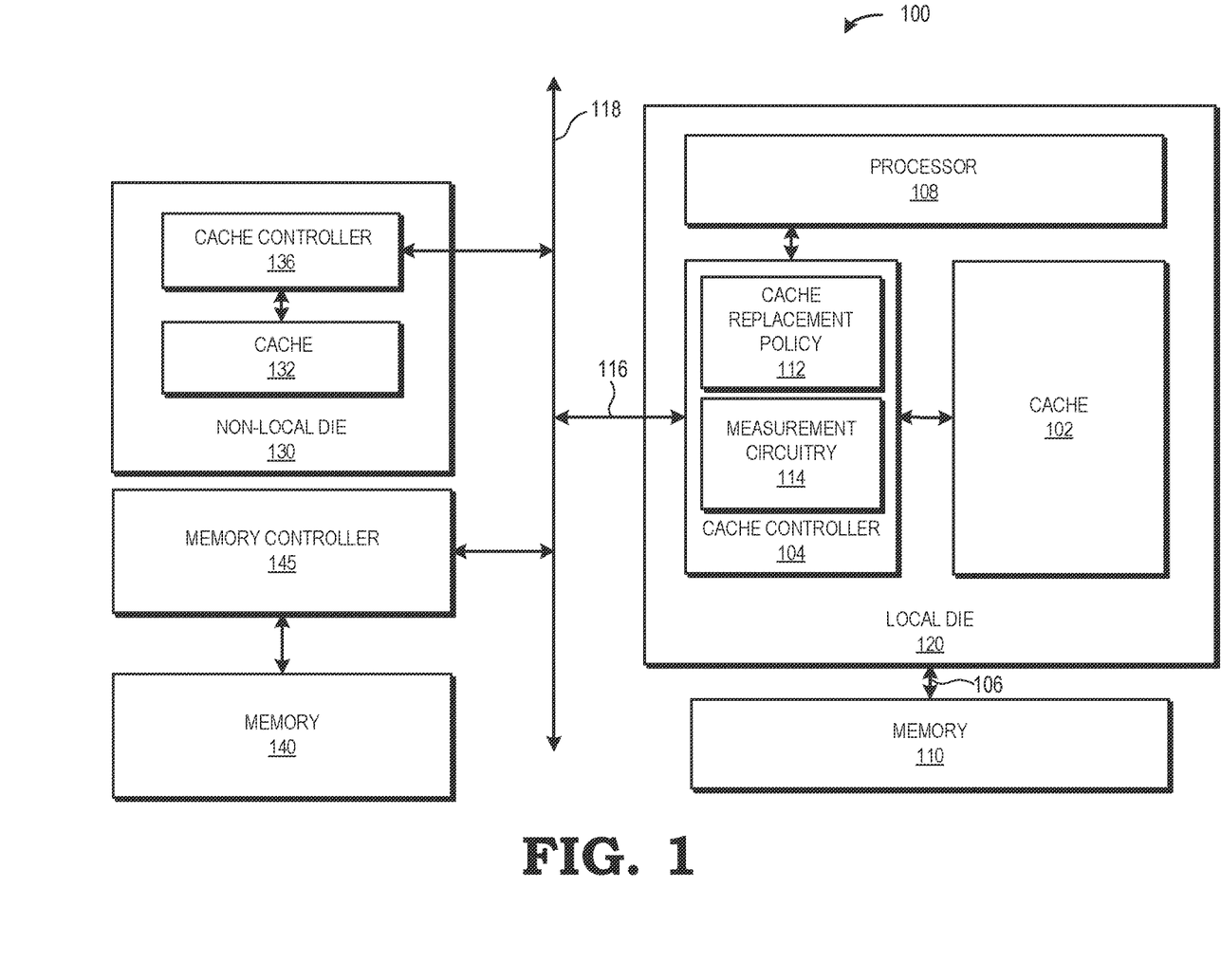
FIG. 1 is a block diagram of a processing system having a non-uniform memory architecture in which a cache adaptively prioritizes local data or non-local data for replacement based on a cache replacement policy and a proportion of local data to non-local data stored at the cache in accordance with some embodiments.

FIG. 1 illustrates a processing system 100 having a memory hierarchy that employs a cache replacement policy based at least in part on locality of data resident in a cache that stores data accessed from both local and non-local memory channels in accordance with some embodiments. The processing system 100 includes a cache 102 at a local die 120, a non-local die 130, and a memory 140. The local die 120 also includes a processor 108, and a cache controller 104. The local die 120 is in communication with a memory 110 attached to the local die 120 via a local memory channel 106 and is in communication with the non-local die 130 and the memory 140 via a bus 118. The non-local die 130 includes a cache controller 136 and a cache 132. The bus 118 supports data flows between endpoints within the processing system 100. Some embodiments of the bus 118 are implemented as a peripheral component interconnect (PCI) bus, PCI-E bus, or other type of bus that supports data flows between connecting points such as peripheral component interface (PCI) physical layers, memory controllers, universal serial bus (USB) hubs, computing and execution units including the processor 108, as well as other endpoints. Components of the processing system 100 may be implemented as hardware, firmware, software, or any combination thereof. It should be appreciated that processing system 100 may include one or more software, hardware, and firmware components in addition to or different from those shown in FIG. 1. For example, processing system 100 may additionally include one or more input interfaces, non-volatile storage, one or more output interfaces, network interfaces, and one or more displays or display interfaces. The processing system 100 includes, for example, a server, a desktop computer, laptop computer, tablet computer, mobile phone, gaming console, and the like.

The processor 108 is implemented as a central processor unit core (CPU), graphics processor unit core (GPU), specialized processor core or accelerator, application-specific integrated circuit (ASIC), field programmable gate array (FPGA), and the like. The processor 108 includes one or more instruction pipelines to execute instructions, thereby carrying out tasks on behalf of an electronic device. While the processor 108 may have some amount of integral memory, for example, in the form of a register file, such memory is typically limited in storage capacity. Accordingly, in order to execute instructions, the processor 108 stores and retrieves data from a memory hierarchy of the processing system 100, including a cache hierarchy made up of the caches 102, 132, off-die memory 110 attached to the local die 120, and the memory 140. In particular, in the course of executing instructions, the processor 108 generates operations, referred to as memory access requests, to store (a store operation) data at or load (a load operation) data from the memory hierarchy. The cache hierarchy and memory 140 work together to satisfy memory access requests, as described further herein.

The memory controller 145 operates as the interface between the cache hierarchy and the memory 140. Thus, data to be cached in the cache hierarchy typically is manipulated as blocks of data referred to as "cache lines", and which are addressed or otherwise located in the memory hierarchy using a physical address of memory 140. Cache lines are accessed from the memory 140 by the memory controller 145 in response to memory requests from the cache hierarchy, and the cache lines are stored, or cached, in one or more caches 102, 132 of the cache hierarchy. Likewise, when a cache line containing modified data is evicted from the cache hierarchy and thus needs to be updated in the memory 140, the memory controller 145 manages this write-back process.

Although only one cache is shown on each die in the illustrated example, the cache hierarchy includes one or more levels of caches, such as a first level (L0) cache, a second level (L1) cache, and a third level (L2) cache. In other embodiments the cache hierarchy includes fewer or more than three levels. The caches of the cache hierarchy are used to cache data for access and manipulation by the processor 108. Typically, caches at a lower level (e.g., L0) tend to have lower storage capacity and lower access latencies, while caches at the higher level (e.g., L2) tend to have higher storage capacity and higher access latencies. Accordingly, cache lines of data are transferred among the caches of different cache levels so as to better optimize the utilization of the cache data in view of the caches' storage capacities and access latencies through cache line eviction processes and cache line installation processes managed by cache logic of the cache controller (e.g., cache controller 104) of the individual caches of the cache hierarchy.

The cache controller 104 receives memory access requests for data from the processor 108 and searches the cache 102 to determine if one of the cache entries stores a cache line associated with the memory address targeted by the memory access request. If the requested cache line is found in the cache 102, a cache hit has occurred. In the event of a cache hit, the cache controller 104 satisfies the memory access request by, in the case of a read operation, providing the requested cache line from the cache 102 to the processor 108 or, in the case of a write operation, storing the write data to the cache entry. If the requested cache line is not found in the cache 102, a cache miss has occurred. In the event of a cache miss at the cache 102, the cache controller 104 provides the memory access request to an off-die memory 110 attached to the local die 120 via a local memory channel 106.

The off-die memory 110 is a memory that in some embodiments shares address space with memory 140. A memory controller (not shown) for the off-die memory 110 receives memory access requests from the cache controller 104 in response to cache misses at the cache 102. In response to receiving a memory access request, the memory controller identifies retrieves data from the off-die memory 110 associated with the memory address targeted by the memory access request.

As with the cache 102, the cache 132 is a memory including a set of entries, with each entry configured to store a cache line. The cache controller 136 receives memory access requests from the cache controller 104. In response to receiving a memory access request, the cache controller 136 identifies whether an entry of the cache 132 stores data associated with the memory address targeted by the memory access request. In the event of a cache hit, the cache controller 136 provides the requested data from the cache 132 to the cache 102, which satisfies the memory access request as described above. In the event of a cache miss at the cache 132, the cache controller 136 provides the memory access request to the memory 140. The memory controller 145 retrieves the cache line at the memory address of the memory 140 targeted by the request and provides the cache line to the cache 132, which in turn provides the cache line to the cache 102, where the memory access request is satisfied. Thus, as described above, the memory access request traverses the memory hierarchy until the requested data is found. The requested data is then transferred to the cache 102, wherein the memory access request is satisfied.

In some embodiments, each of the cache 102 and the cache 132 is a set associative cache, wherein each cache is divided into a number of sets. Each set includes a number of ways, with each way corresponding to a cache entry that stores a cache line. Each set only stores a cache line associated with a subset of memory addresses, wherein the subset associated with a set is identified by the corresponding cache controller based on a portion of the memory address referred to as the index. By employing set associativity, the caches 102, 132 facilitate relatively quick identification of cache misses and cache hits.

In some embodiments, the cache 102 is sized such that it is typically unable to store, at a given point in time, all the data that is requested, or may be requested, by the processor 108, thereby requiring data to be transferred through the memory hierarchy as described above. To ensure data coherency and efficient transfer of data through the memory hierarchy, the cache controller 104 implements a replacement policy to identify if there is an entry in a set available to store a received cache line and, if not, to select one of the entries in the set for replacement. The availability of a cache entry is indicated by status information associated with the entry, referred to as the valid status of the entry. In particular, a cache line having an invalid status (referred to herein as an invalid cache line) is one that is available to store data and a cache line having a valid validity status (referred to herein as a valid cache line) is one that is not available to store data unless it is replaced. To replace a valid cache line at an entry with an incoming cache line, the cache controller for the cache first evicts the valid cache line by transferring it to one or more other levels of the memory hierarchy, and then stores the incoming cache line at the entry.

To illustrate, in response to a reset of the processing system 100, all cache lines in the cache 102 are set by the cache controller 104 to an invalid state. As a cache entry is populated with a cache line retrieved from memory 140, the cache controller 104 sets the cache entry to a valid state. A cache way containing a cache line that has been set to an invalid state may receive an incoming cache line, which will displace or overwrite the invalid cache line. When the cache 102 receives a cache line to be stored, it must select a cache way where the cache line is to be stored. If the cache set associated with the incoming cache line has room available (i.e., has one or more cache ways indicated as containing invalid cache lines), the incoming cache line will be stored at one of the invalid ways. However, if all cache ways in the set associated with the incoming cache line are indicated as valid, the cache controller 104 selects a cache line of the set associated with the new cache line to be evicted to make room for the incoming cache line.

The particular criteria employed by a cache controller 104 to select the cache line for replacement is referred to as a replacement policy. For example, in some embodiments the cache controller 104 implements a cache replacement policy 112 at the cache 102 wherein it selects for eviction the least recently used cache line (that is, the cache line that was least recently the target of a memory access operation) in the cache set associated with the incoming cache line. In other embodiments, the cache controller 104 implements a cache replacement policy 112 at the cache 102 wherein it selects for eviction the least frequently used cache line (that is, the cache line that was historically the least frequent target of memory access operations for a particular time period) in the cache set associated with the incoming cache line. Other replacement policies include re-reference interval prediction.

It will be appreciated that accesses via the non-local memory channel 116 take more time that accesses via the local memory channel 106, as they must traverse a longer distance and may encounter delays at, e.g., the bus 118. The variable caching latency that results from the differences in access times for cache misses that are satisfied via local vs. non-local memory channels negatively impacts processing performance. In some embodiments, the cache controller 104 includes measurement circuitry 114. The measurement circuitry 114 periodically collects information regarding the proportion of local data to non-local data stored at the cache 102. For example, in some embodiments, the measurement circuitry 114 maintains a count of the number of cache lines resident at the cache 102 that were fetched via the local memory channel 106 and a count of the number of cache lines resident at the cache 102 that were fetched via the non-local memory channel 116.

To facilitate more efficient caching of both local and non-local data at the cache 102, the cache controller 104 applies a cache replacement policy 112 based at least in part on the locality (i.e., local vs. non-local origin) of the data stored at the cache 102. Depending on factors such as the cache access history, the demands of an application (not shown) executing at the processor 108, and a proportion of local to non-local data stored at the cache 102, the cache controller 104 assigns a priority to each cache line based on whether the cache line was accessed via the local memory channel 106 or the non-local memory channel 116, as described in more detail below.

Figure 2:
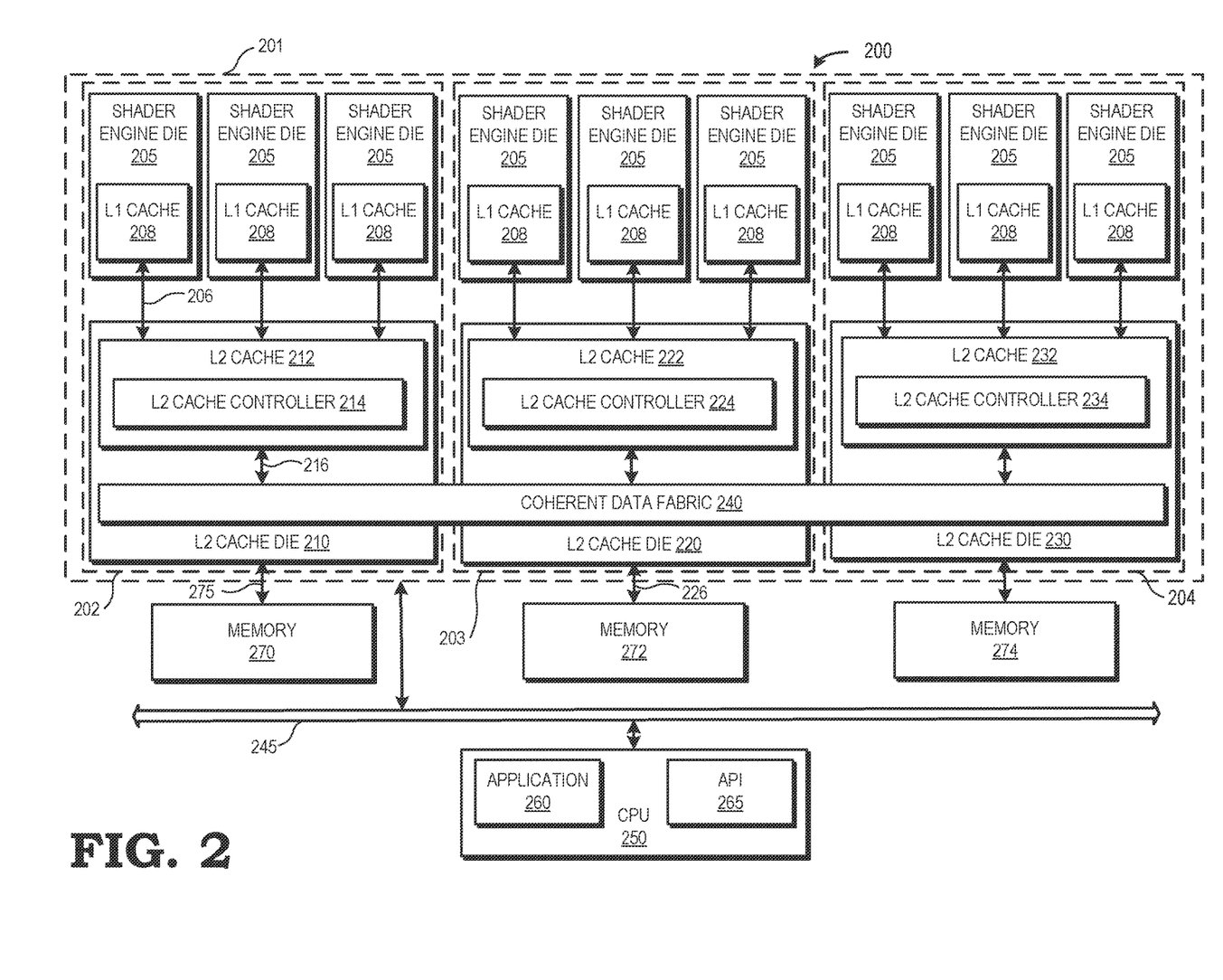
FIG. 2 is a block diagram of a processing system including multiple processing units that are partitioned into multiple subsets of dies in accordance with some embodiments.

In some embodiments, the processing system 100 is implemented in a multiple chiplet system such as that illustrated in FIG. 2. FIG. 2 is a block diagram of a processing system 200 including multiple processing units that are partitioned into multiple subsets of dies in accordance with some embodiments. The processing system 100 implements a multiple-die processing unit 201 according to some embodiments. In various embodiments, the multiple-die processing unit 201 is a parallel processor that includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof.

The processing system 200 includes one or more central processing units (CPUs) 250. Although one CPU 250 is shown in FIG. 1, some embodiments of the processing system 100 include more CPUs. A bus 245 supports data flows between endpoints within the processing system 200, including the multiple-die processing unit 201 and the CPU 250, as well as other endpoints.

In various embodiments, the CPU 250 is connected via the bus 245 to memories 270, 272, 274, which are implemented in some embodiments as dynamic random access memory (DRAM). In various embodiments, the memories 270, 272, 274 can also be implemented using other types of memory including static random access memory (SRAM), nonvolatile RAM, and the like. In the illustrated embodiment, the CPU 250 communicates with the memories 270, 272, 274 and also the multiple-die processing unit 201 over the bus 245. However, some embodiments of the processing system 200 include the multiple-die processing unit 201 communicating with the CPU 250 over a direct connection or via dedicated buses, bridges, switches, routers, and the like.

As illustrated, the CPU 250 includes a number of processes, such as executing one or more application(s) 260 to generate graphic commands. In various embodiments, the one or more applications 260 include applications that utilize the functionality of the multiple-die processing unit 201, such as applications that generate work in the processing system 200 or an operating system (OS). In some implementations, an application 260 includes one or more graphics instructions that instruct the multiple-die processing unit 201 to render a graphical user interface (GUI) and/or a graphics scene. For example, in some implementations, the graphics instructions include instructions that define a set of one or more graphics primitives to be rendered by the multiple-die processing unit 201.

In some embodiments, the application 260 utilizes a graphics application programming interface (API) 265 to invoke a user mode driver (not shown) (or a similar GPU driver). The user mode driver issues one or more commands to the multiple-die processing unit 201 for rendering one or more graphics primitives into displayable graphics images. Based on the graphics instructions issued by application 260 to the user mode driver, the user mode driver formulates one or more graphics commands that specify one or more operations for multiple-die processing unit 201 to perform for rendering graphics. In some embodiments, the user mode driver is a part of the application 260 running on the CPU 250. For example, in some embodiments the user mode driver is part of a gaming application running on the CPU 250. Similarly, in some implementations a kernel mode driver (not shown), alone or in combination with the user mode driver, formulates the one or more graphics commands as part of an operating system running on the CPU 250.

The multiple-die processing unit 201 illustrated in FIG. 2 includes three chiplet sets 202, 203, 204. Each chiplet set 202, 203, 204 includes a set of shader engine dies (SE) 205 that are used to receive and execute commands concurrently or in parallel. In some embodiments, each SE die 205 includes a configurable number of shader engines, in which each shader engine includes a configurable number of work group processors, and each work group processor includes a configurable number of compute units. Some embodiments of the SE dies 205 are configured using information in draw calls received from the CPU 250 to shade vertices of primitives that represent a model of a scene. Although three SE dies 205 are illustrated for each GPU chiplet set 202, 203, 204 such that a total of nine SE dies 205 are shown in FIG. 2, some embodiments of the multiple-die processing unit 201 include more or fewer include more or fewer shader engine dies 205. Further, although three L2 cache dies 210, 220, 230 are shown in FIG. 2, the number of L2 cache dies and corresponding shader engine dies in the multiple-die processing unit 201 is a matter of design choice and varies in other embodiments.

Each SE die 205 includes an L1 cache 208 to store data accessed directly by the corresponding SE die 205. In addition, each set of SE dies 205 in a chiplet set 202, 203, 204 is connected to an L2 cache die (e.g., L2 cache die 210, L2 cache die 220, and L2 cache die 230) that includes an corresponding L2 cache 212, 222, 232 that stores frequently used data and instructions that includes both local and non-local data for access by the shader engines at each of the SE dies 205 and a corresponding L2 cache controller 214, 224, 234. In some embodiments, each L2 cache 212, 222, 232 is connected to one or more L1 caches 208 that are implemented in the SE dies 205 and one or more L3 caches (or other last level caches) implemented in the processing system 200. The caches collectively form a cache hierarchy. Each L2 cache die 210, 220, 230 is further connected to respective off-die memories 270, 272, 274 via respective local memory channels 275, 226.

In the depicted embodiment of FIG. 2, a coherent data fabric 240 communicably couples the L2 cache dies 210, 220, 230 to each other. The coherent data fabric 240 includes a crossbar switch for routing memory access requests and memory responses between any memory accessing. In some embodiments, the coherent data fabric 240 also includes a system memory map, defined by basic input/output system (BIOS), for determining destinations of memory accesses based on the system configuration, as well as buffers for each virtual connection.

As a general operational overview, the L2 cache 212 is communicatively coupled to each of the L1 caches 208 of the corresponding SE dies 205 for the chiplet set 202 via a data bus 206 and the L2 cache die 210 is communicatively coupled to the memory 270 via the local memory channel 275. Likewise, the L2 cache 222 is communicatively coupled to each of the L1 caches 208 of the corresponding SE dies 205 for the chiplet set 203 and the L2 cache 232 is communicatively coupled to each of the L1 caches 208 of the corresponding SE dies 205 for the chiplet set 204 via respective data buses and the L2 cache die 220 is communicatively coupled to the memory 272 via the local memory channel 226. The L2 cache 212 is communicatively coupled to each of the L1 caches 208 of the SE dies 205 of the chiplet sets 203, 204 via a non-local memory channel 216 that accesses the coherent data fabric 240. Similarly, the L2 caches 222, 232 are communicatively coupled to the L1 caches 208 of the SE dies 205 of the chiplet set 202 (and to the other of chiplet sets 203 204) via respective non-local memory channels. Consequently, any inter-chiplet set memory accesses are routed through the coherent data fabric 240 as appropriate to access memory channels on other chiplet sets. In this manner, the multiple-die processing unit 201 includes chiplet sets that are addressable as a single, monolithic processing unit from a software developer's perspective (e.g., the CPU 250 and any associated applications/drivers are unaware of the chiplet-based architecture), and therefore avoids requiring any chiplet-specific considerations on the part of a programmer or developer.

However, any inter-chiplet set memory accesses incur a latency penalty from having to traverse the non-local memory channel. For example, in response to a cache miss for non-local data at the L2 cache 212 and the memory 270 connected to the L2 cache die 210 via the local memory channel 275, the L2 cache controller 214 provides the memory access request to the L2 cache controller 224 at the chiplet set 203 via the coherent data fabric 240. The L2 cache controller 224 receives the memory access request from the L2 cache controller 214. In response to receiving the memory access request, the L2 cache controller 224 identifies whether an entry of the L2 cache 222 stores data associated with the memory address targeted by the memory access request. In the event of a cache hit, the L2 cache controller 224 provides the requested data from the L2 cache 222 to the L2 cache 212 via the coherent data fabric 240, which satisfies the memory access request. In the event of a cache miss at the L2 cache 222, the L2 cache controller 224 provides the memory access request to the memory 272 via the memory channel 226, which is non-local to the L2 cache die 210 from which the cache miss originated. The memory controller (not shown) retrieves the cache line at the memory address of the memory 272 targeted by the request and provides the cache line to the L2 cache 232, which in turn provides the cache line to the L2 cache 212, where the memory access request is satisfied.

Figure 3:
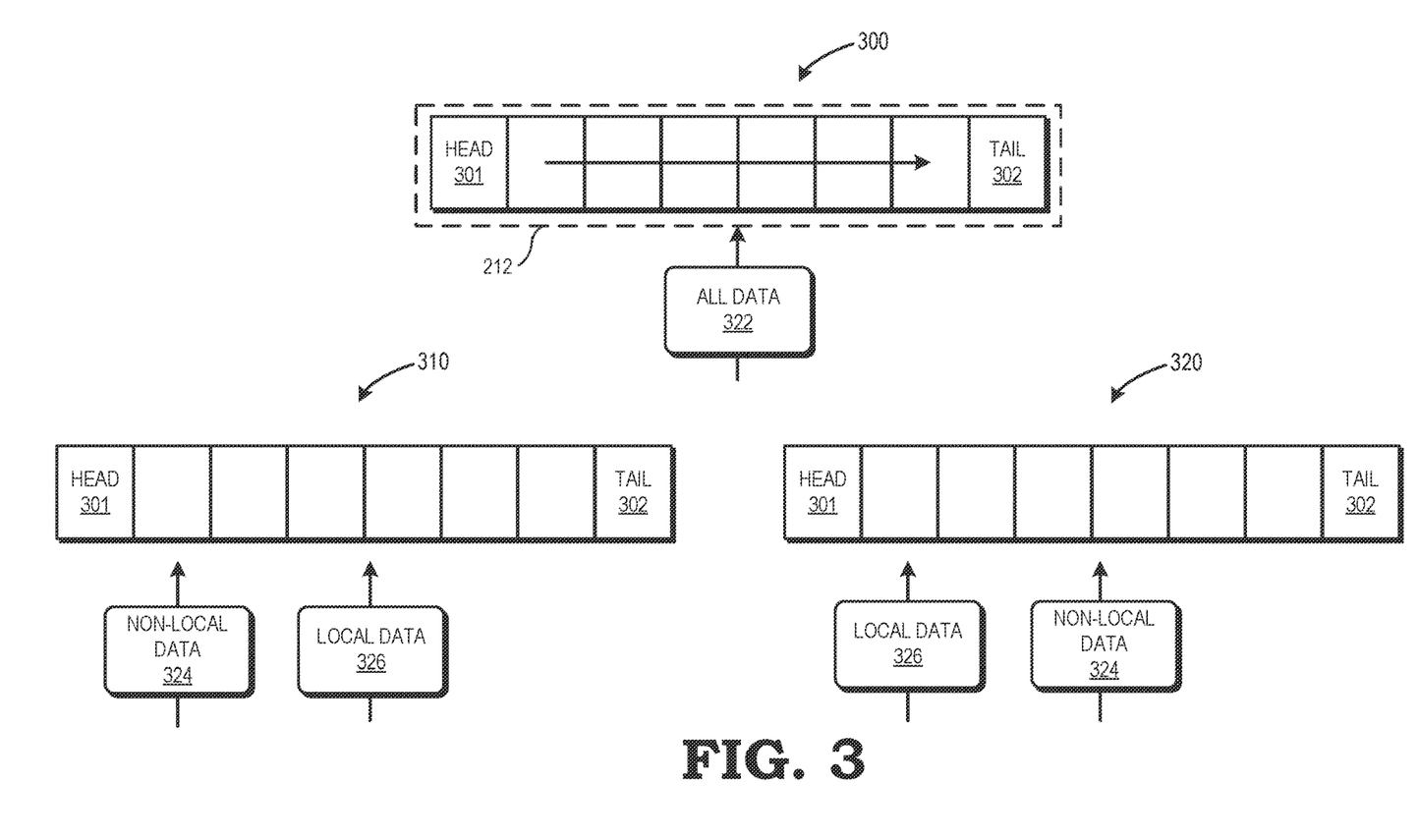
FIG. 3 is a block diagram illustrating prioritization of local data and non-local data based on cache replacement policies and a proportion of local data to non-local data stored at a cache in accordance with some embodiments.

FIG. 3 is a block diagram illustrating prioritization of local data and non-local data based on cache replacement policies and a proportion of local data to non-local data stored at a cache in accordance with some embodiments. If a non-random replacement policy is used, the cache effectively maintains an ordered list of eviction candidates, which in the case of an LRU or most recently used (MRU)-type policy can be referred to as a reference chain of entries in which accessed entries are promoted to the head of the chain according to the replacement policy. Under an LRU policy, entries are evicted from the tail of the chain, whereas under an MRU policy, entries are evicted from the head of the chain.

In the illustrated example, the L2 cache 212 includes a reference chain of cache entries. Under a cache replacement policy that favors neither local data nor non-local data, data fetched to the L2 cache 212 is initially placed at the middle of the reference chain. If the data is subsequently requested, the data moves toward the head 301 of the reference chain. As additional data is fetched to the L2 cache 212, the data initially stored at middle of the reference chain, if not requested, moves toward the bottom of the reference chain, referred to as the tail 302 of the reference chain. When data is evicted from the L2 cache 212, the data is replaced from the tail 302 of the reference chain. Under the cache replacement policy 300, the L2 cache controller 214 assigns all data 322 (including both local and non-local data) to the same priority within the reference chain when first fetched to the L2 cache 212.

Under a cache replacement policy 310, non-local data 324 is prioritized to reduce average latency. Based on the cache replacement policy 310, the L2 cache controller 214 assigns local data 326 a priority that places the local data 326 at the middle of the reference chain when first fetched and assigns non-local data 324 a priority that places the non-local data 324 toward the head 301 of the reference chain. Accordingly, local data 326 is more likely to reach the tail 302 of the reference chain before the non-local data 324, and therefore faces a higher probability of being evicted from the L2 cache 212 than the non-local data 324.

Conversely, under a cache replacement policy 320, local data 322 is prioritized. For example, placement of local data may be prioritized in the case of non-uniform miss rates between local data 322 and non-local data 324. To illustrate, if a re-reference interval on non-local data 324 is such that it would always thrash the cache, but a shorter re-reference interval for local data 322 would keep the data in the cache, the cache replacement policy 320 may prioritize local data 322. Based on the cache replacement policy 320, the L2 cache controller 214 assigns non-local data 324 a priority that places the non-local data 324 at the middle of the reference chain when first fetched and assigns local data 326 a priority that places the local data 326 toward the head 301 of the reference chain. Accordingly, non-local data 324 is more likely to reach the tail 302 of the reference chain before the local data 326, and therefore faces a higher probability of being evicted from the L2 cache 212 than the local data 326. Thus, the assigned priority of the local and non-local data is represented by the data's initial proximity to the head 301 or tail 302 of the L2 cache 212.

In some embodiments, logic at the L2 cache controller 214 applies a cache replacement policy that prioritizes either local or non-local data based on the demands of an application 260 executing at the processing system 200. In some embodiments, the L2 cache controller 214 adjusts the respective priorities of local and non-local data based on the relative proportions of local and non-local data stored at the L2 cache 212.

Figure 4:
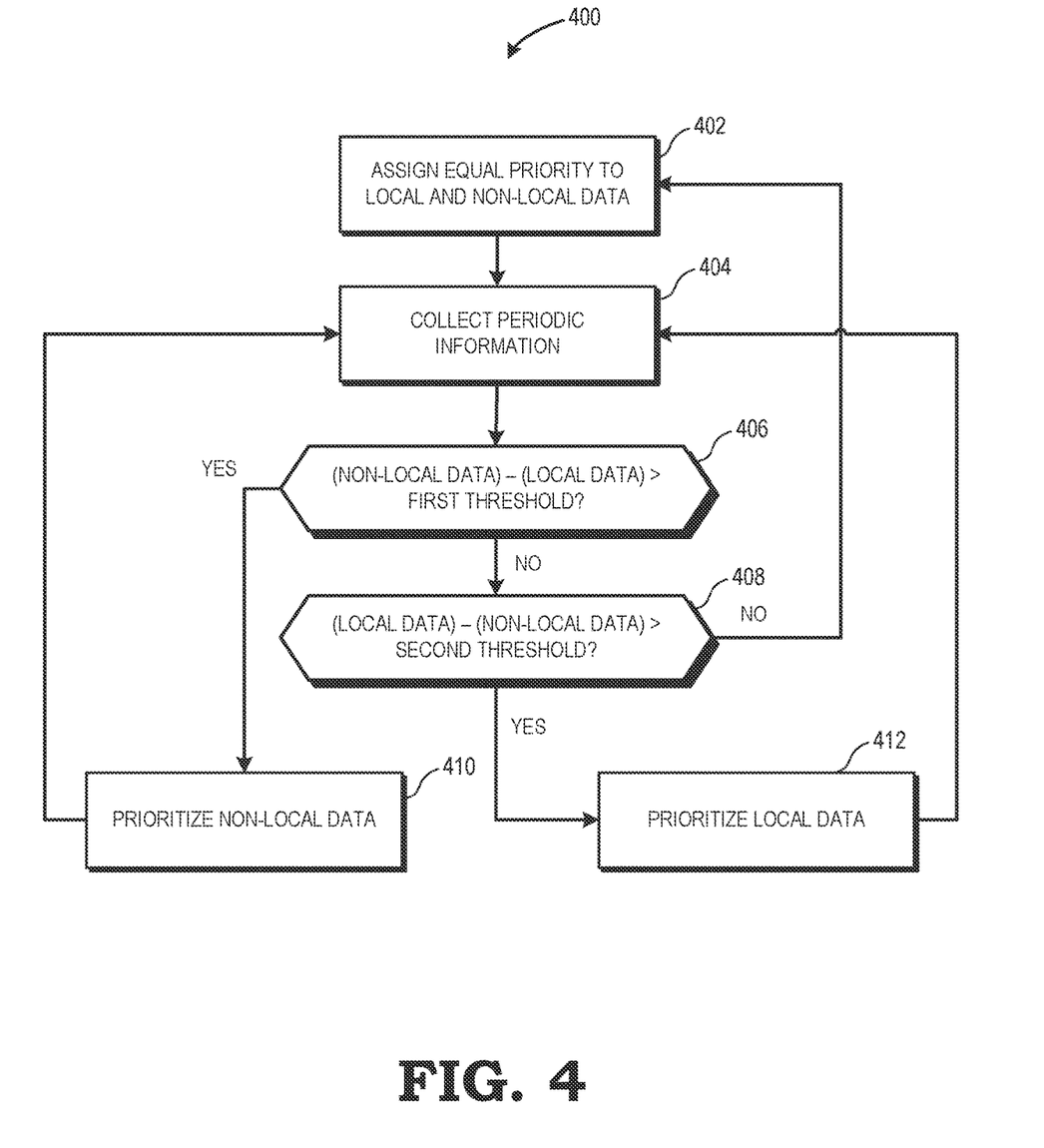
FIG. 4 is a flow diagram illustrating a method for adaptively prioritizing local data or non-local data based on cache replacement policies and a proportion of local data to non-local data stored at a cache in accordance with some embodiments.

FIG. 4 is a flow diagram illustrating a method 400 for adaptively prioritizing local data or non-local data based on cache replacement policies and a proportion of local data to non-local data stored at a cache in accordance with some embodiments. In some embodiments, the method 400 is implemented at a processing system such as the processing system 100 of FIG. 1 or the processing system 200 of FIG. 2.

At block 402, the L2 cache controller 214 applies a cache replacement policy that favors neither local data nor non-local data. Accordingly, at block 402, the L2 cache controller 214 assigns equal priority to both local data 326 and non-local data 324. In some embodiments, the L2 cache controller 214 therefore places all data 322 at the middle of the reference chain of the L2 cache 212.

At block 404, measurement circuitry 114 of the L2 cache controller 214 periodically collects information regarding the amount (e.g., number of cache lines) of local data 326 and non-local data 324 stored at the L2 cache 212. Based on information collected by the measurement circuitry 114, the L2 cache controller 214 determines the relative proportions of local data 326 and non-local data 324 stored at the L2 cache 212.

In the illustrated example, at block 406, the L2 cache controller 214 determines whether the amount of non-local data 324 stored at the L2 cache 212 exceeds the amount of local data 326 stored at the L2 cache 212 by more than a first threshold amount. In other embodiments, the L2 cache controller 214 determines whether a proportion of non-local data 324 to local data 326 stored at the L2 cache 212 exceeds a first threshold amount. If, at block 406, the L2 cache controller 214 determines that the first threshold has been exceeded, the method flow continues to block 410.

At block 410, the L2 cache controller 214 prioritizes non-local data 324 for replacement. In some embodiments, the L2 cache controller 214 prioritizes non-local data 324 by assigning a higher priority for replacement to non-local data 324. For example, the L2 cache controller 214 assigns local data 326 a priority that places the local data 326 toward the head 301 of the reference chain of the L2 cache 212 and assigns non-local data 324 a priority that places non-local data 324 at the middle (or nearer to the tail 302) of the reference chain. The method flow then continues back to block 404.

If, at block 406, the L2 cache controller 214 determines that the first threshold has not been exceeded, the method flow continues to block 408. At block 408, the L2 cache controller 214 determines whether the amount of local data 326 stored at the L2 cache 212 exceeds the amount of non-local data 324 stored at the L2 cache 212 by more than a second threshold amount. In other embodiments, the L2 cache controller 214 determines whether a proportion of local data 326 to non-local data 324 stored at the L2 cache 212 exceeds the second threshold amount. In some embodiments, the first and second thresholds are the same, and in other embodiments, the first and second thresholds differ from each other. If, at block 408, the L2 cache controller 214 determines that the second threshold has not been exceeded, the method flow continues back to block 402.

If, at block 408, the L2 cache controller 214 determines that the second threshold has been exceeded, the method flow continues to block 412. At block 412, the L2 cache controller 214 prioritizes local data 326 for replacement. In some embodiments, the L2 cache controller 214 prioritizes local data 326 by assigning a higher priority for replacement to local data 326. For example, the L2 cache controller 214 assigns non-local data 324 a priority that places the local data toward the head 301 of the reference chain of the L2 cache 212 and assigns local data 326 a priority that places local data 326 at the middle (or nearer to the tail 302) of the reference chain. The method flow then continues back to block 404.

In some embodiments, the apparatus and techniques described above are implemented in a system including one or more integrated circuit (IC) devices (also referred to as integrated circuit packages or microchips), such as the processing systems described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   assigning, based on a cache replacement policy, a priority of local data stored at a cache of a processing system, wherein the local data comprises data accessed from a local memory via a local memory channel, and a priority of non-local data stored at the cache, wherein the non-local data comprises data accessed from a non-local memory via a non-local memory channel;
   adjusting the priority of local data stored at the cache and the priority of non-local data stored at the cache based on a proportion of local data to non-local data stored at the cache; and
   selecting data for replacement at the cache based on the assigned priorities.

2. The method of claim 1, further comprising:
   periodically measuring an amount of local data stored at the cache and an amount of non-local data stored at the cache.

3. The method of claim 1, further comprising:
increasing the priority of non-local data in response to an amount of non-local data stored at the cache exceeding an amount of local data stored at the cache by more than a first threshold amount.

4. The method of claim 1, further comprising:
increasing the priority of local data in response to an amount of local data stored at the cache exceeding an amount of non-local data stored at the cache by more than a second threshold amount.

5. The method of claim 1, further comprising:
assigning equal priorities to local data and non-local data stored the cache in response to an amount of non-local data stored at the cache not exceeding an amount of local data stored at the cache by a first threshold amount and the amount of local data stored at the cache not exceeding the amount of non-local data stored at the cache by more than a second threshold amount.

6. The method of claim 5, wherein the first threshold amount is equal to the second threshold amount.

7. The method of claim 1, wherein assigning is based on an application executing at the processing system.

8. A processing system comprising:
a cache configured to store local data accessed from a local memory via a local memory channel and non-local data accessed from a non-local memory via a non-local memory channel; and
a cache controller configured to:
assign a priority to the local data and a priority to the non-local data based on a cache replacement policy;
select data for replacement at the cache based on the assigned priorities; and
adjust the priority of the local data stored at the cache and the priority of the non-local data stored at the cache based on a proportion of the local data to the non-local data stored at the cache.

9. The processing system of claim 8, wherein the cache controller is further to: periodically measure an amount of local data stored at the cache and an amount of non-local data stored at the cache.

10. The processing system of claim 8, wherein the cache controller is further to: increase the priority of non-local data in response to an amount of non-local data stored at the cache exceeding an amount of local data stored at the cache by more than a first threshold amount.

11. The processing system of claim 8, wherein the cache controller is further to:
increase the priority of local data in response to an amount of local data stored at the cache exceeding an amount of non-local data stored at the cache by more than a second threshold amount.

12. The processing system of claim 8, wherein the cache controller is further to:
assign equal priorities to local data and non-local data stored the cache in response to an amount of non-local data stored at the cache not exceeding an amount of local data stored at the cache by a first threshold amount and the amount of local data stored at the cache not exceeding the amount of non-local data stored at the cache by more than a second threshold amount.

13. The processing system of claim 12, wherein the first threshold amount is equal to the second threshold amount.

14. The processing system of claim 8, wherein the cache controller is further to: assign priorities based on an application executing at the processing system.

15. A processing system, comprising:
a cache at a first subset of dies of the processing system; and
a cache controller configured to:
adaptively prioritize one of local data and non-local data for replacement at the cache based on a cache replacement policy and a proportion of local data to non-local data stored at the cache, wherein:
local data comprises data accessed from a local memory at the first subset of dies via a local memory channel; and
non-local data comprises data accessed from a non-local memory at a second subset of dies of the processing system via a non-local memory channel.

16. The processing system of claim 15, wherein the cache controller is further to:
periodically measure an amount of local data stored at the cache and an amount of non-local data stored at the cache.

17. The processing system of claim 15, wherein the cache controller is further to:
increase the priority of non-local data in response to an amount of non-local data stored at the cache exceeding an amount of local data stored at the cache by more than a first threshold amount.

18. The processing system of claim 15, wherein the cache controller is further to:
increase the priority of local data in response to an amount of local data stored at the cache exceeding an amount of non-local data stored at the cache by more than a second threshold amount.

19. The processing system of claim 15, wherein the cache controller is further to:
assign equal priorities to local data and non-local data stored the cache in response to an amount of non-local data stored at the cache not exceeding an amount of local data stored at the cache by a first threshold amount and the amount of local data stored at the cache not exceeding the amount of non-local data stored at the cache by more than a second threshold amount.

20. The processing system of claim 15, wherein the cache controller is further to:
assign priorities based on an application executing at the processing system.

* * * * *